US005909516A

United States Patent [19]

Lubin

[11] Patent Number: 5,909,516

[45] Date of Patent: *Jun. 1, 1999

[54] METHOD AND APPARATUS FOR DECOMPOSING AN IMAGE STREAM INTO UNITS OF LOCAL CONTRAST

[75] Inventor: Jeffrey Lubin, South Orange, N.J.

[73] Assignee: Sarnoff Corporation, Princeton, N.J.

[ * ] Notice: This patent is subject to a terminal disclaimer.

[21] Appl. No.: 08/829,540

[22] Filed: Mar. 28, 1997

Related U.S. Application Data

[60] Provisional application No. 60/014,324, Mar. 29, 1996, and provisional application No. 60/014,332, Mar. 29, 1996.

[51] Int. Cl.[6] ................................ G06T 5/00; G06T 7/00

[52] U.S. Cl. .......................... 382/260; 382/263; 382/264; 382/302

[58] Field of Search .................................... 382/260, 264, 382/302, 263, 254, 275, 303; 348/623, 25, 107, 153, 451

[56] References Cited

U.S. PATENT DOCUMENTS

| | | | |
|---|---|---|---|
| 4,551,753 | 11/1985 | Nishizawa et al. | 358/140 |
| 4,675,532 | 6/1987 | Carson | 348/294 |
| 4,939,760 | 7/1990 | Kawai | 378/99 |
| 5,109,425 | 4/1992 | Lawton | 348/25 |
| 5,119,195 | 6/1992 | Christopher | 348/623 |
| 5,260,791 | 11/1993 | Lubin | 348/623 |
| 5,467,404 | 11/1995 | Vuylsteke et al. | 382/274 |
| 5,694,491 | 12/1997 | Brill et al. | 382/260 |
| 5,719,966 | 2/1998 | Brill et al. | 382/260 |

OTHER PUBLICATIONS

"Contrast in Complex Images", E. Peli, J. Opt. Soc. Am. A/vol. 7, No. 10, Oct. 1990, pp. 2032–2040.

*Primary Examiner*—Scott Rogers
*Assistant Examiner*—Chad J. Billings
*Attorney, Agent, or Firm*—William J. Burke

[57] ABSTRACT

An apparatus and concomitant method for decomposing an image stream into units of local contrast. A temporal contrast transform (pyramid), comprises a spatial filter, a cascade of lowpass temporal filters and a plurality of subtractors and dividers. The spatial filter is followed by a cascade of lowpass temporal filters, producing a set of temporally lowpass, spatially low pass images. Adjacent filter outputs are then subtracted, producing a set of temporally bandpass (Laplacian) images. Finally, each Laplacian image is divided by a lower level temporal lowpass image, to produce a set of temporally bandpass contrast images.

16 Claims, 3 Drawing Sheets

METHOD AND APPARATUS FOR DECOMPOSING AN IMAGE STREAM INTO UNITS OF LOCAL CONTRAST

This application claims the benefit of U.S. Provisional applications No. 60/014,324 filed Mar. 29, 1996 and No. 60/014,332 filed Mar. 29, 1996.

The present invention relates to an apparatus and concomitant method for evaluating and improving the performance of imaging systems. More particularly, this invention relates to an architecture and concomitant method that decomposes an image stream into units of local contrast.

BACKGROUND OF THE INVENTION

Designers of imaging systems often assess the performance of their designs in terms of physical parameters such as contrast, resolution and bit-rate efficiency in compression/decompression (codec) processes. While these parameters can be easily measured, they may not be accurate gauges for evaluating performance. The reason is that end users of imaging systems are generally more concerned with the subjective visual performance such as the visibility of artifacts or distortions and in some cases, the enhancement of these image features which may reveal information such as the existence of a tumor in an image, e.g., a MRI (Magnetic Resonance Imaging) image or a CAT (Computer-Assisted Tomography) scan image.

For example, an input image can be processed using two different codec algorithms to produce two different codec images. If the measure of codec image fidelity is based purely on parameters such as performing mean squared error (MSE) calculations on both codec images without considering the psychophysical properties of human vision, the codec image with a lower MSE value may actually contain more noticeable distortions than that of a codec image with a higher MSE value.

Over the years, various human visual performance methods (perceptual metric generator or visual discrimination measure) have been used to improve imaging system design. These visual discrimination measure can be broadly classified as "spatial" or "spatiotemporal". Examples of spatial visual discrimination measures include the Carlson and Cohen generator and the square root integral (SQRI) generator. Examples of a spatiotemporal visual discrimination measures (VDM) are disclosed in U.S. Pat. application Ser. No. 08/668,015, filed Jun. 17, 1996 and "Method And Apparatus For Assessing The Visibility Of Differences Between Two Image Sequences" filed on Mar. 28, 1997 with docket number DSRC12146.

However, visual discrimination measures are often required to quickly generate (e.g., in real-time) a perceptual metric (fidelity metric) which is then used to visually optimize some other processes, e.g., encoding applications.

Therefore, a need exists in the art for an architecture and concomitant method that quickly performs the calculations required of the perceptual metric generator. For the device disclosed in DSRC12146, one requirement is to decompose an image stream into units of contrast localized in spatial and temporal frequency.

SUMMARY OF THEE INVENTION

The present invention is an apparatus and concomitant method for decomposing an image stream into units of local contrast for assessing the visibility of differences between two sequences of visual images. The present invention, a temporal contrast transform (pyramid), comprises a spatial prefilter, a cascade of lowpass temporal filters and a plurality of subtractors and dividers.

More specifically, a spatial prefilter is followed by a cascade of lowpass temporal filters, producing a set of temporally lowpass images. Adjacent filter outputs are then subtracted, producing a set of temporally bandpass (Laplacian) images. Finally, each Laplacian image is divided by a lower level temporal lowpass image, to produce a set of temporally bandpass contrast images.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
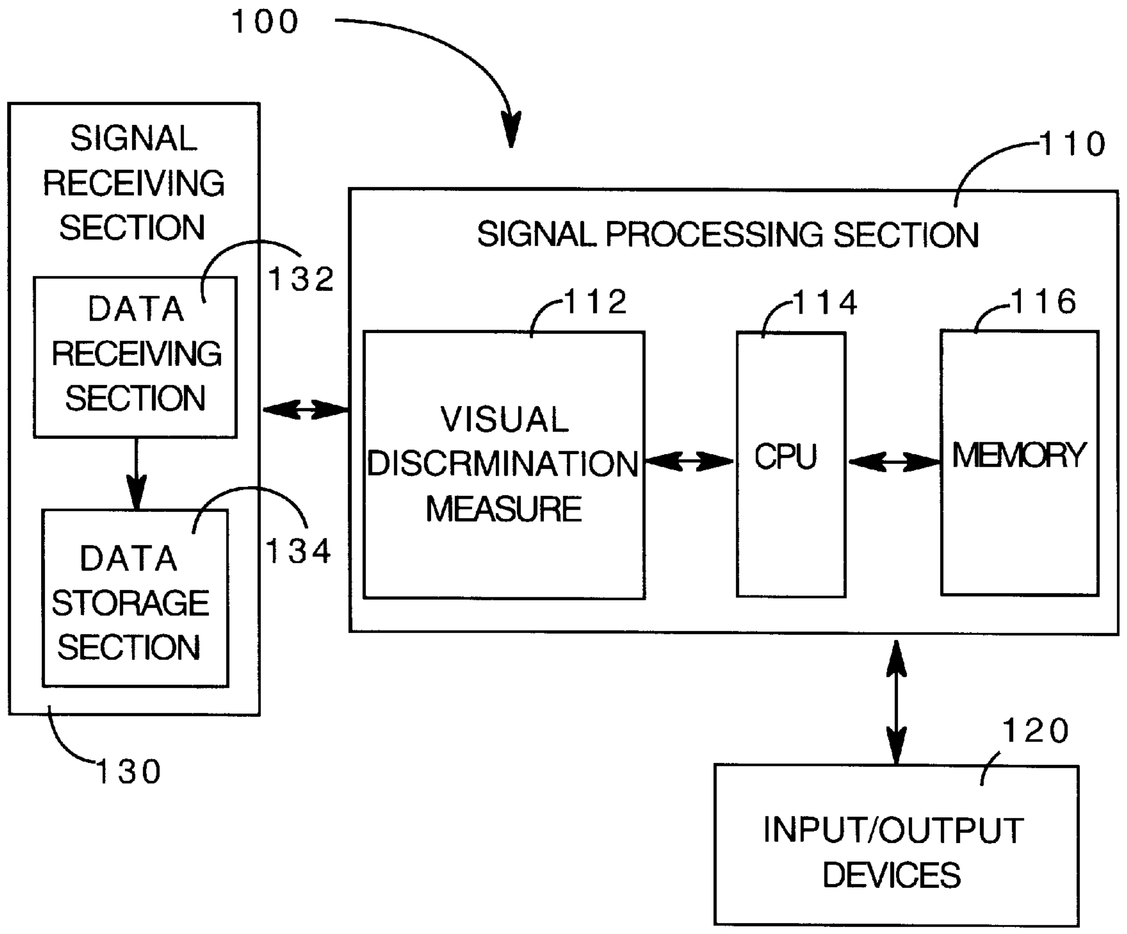
FIG. 1 illustrates a block diagram of a signal processing system of the present invention.

FIG. 1 depicts a signal processing system 100 that utilizes the present invention. The signal processing system consists of a signal receiving section 130, a signal processing section 110 and input/output devices 120.

Signal receiving section 130 serves to receive input data signals, such as sequences of images from imaging devices or other time-varying signals such as audio signals from microphones or recorded media, or financial signals, e.g., daily stock prices. Thus, although the present invention is described below with regard to images, it should be understood that the present invention can be applied to other input signals as discussed above.

Signal receiving section 130 includes a data receiving section 132 and a data storage section 134. Data receiving section 130 may include a number of devices such as a modem and an analog-to-digital converter. A modem is a well-known device that comprises a modulator and a demodulator for sending and receiving binary data over a telephone line or other communication channel, while an analog-to-digital converter converts analog signals into a digital form. Hence, signal receiving section 130 may receive input signals "on-line" or in "real-time" and, if necessary, convert them to a digital form. As such, section 130 may receive signals from one or more devices such as a computer, a camera, a video recorder or various medical imaging devices.

The data storage section 134 serves to store input signals received by data receiving section 132. Data storage section 134 contains one or more devices such as a disk drive, semiconductor memory or other storage media. These storage devices provide a method for applying a delay to the input signals or to simply store the input signals for subsequent processing.

In the preferred embodiment, the signal processing section 110 comprises a general purpose computer having a visual discrimination measure (VDM) 112, a central processing unit (CPU) 114 and a memory 116 to facilitate image processing. The visual discrimination measure 112 can be a physical apparatus constructed from various filters which is coupled to the CPU through a communication channel. Alternatively, the visual discrimination measure 112 can be implemented as a software application recalled from the memory 116 and executed by the CPU of the signal processing section.

The signal processing section 110 is also coupled to a plurality of input and output devices 120 such as a keyboard, a mouse, a video monitor or storage devices including but not limited to a hard disk drive or a compact disk drive. The input devices serve to provide inputs (control signals and data) to the signal processing section for processing the input images, while the output devices serve to display or record the results.

The visual discrimination measure 112 assesses the visibility of differences between two sequences or streams of input images and generates an objective "just-noticeable difference" (JND) image metric. This metric can be expressed as a JND value, a JND map for each pair of input images or a probability prediction. In turn, the CPU may utilize the JND image metric to optimize various processes including, but not limited to, digital image compression, image quality measurement and target detection.

Figure 2:
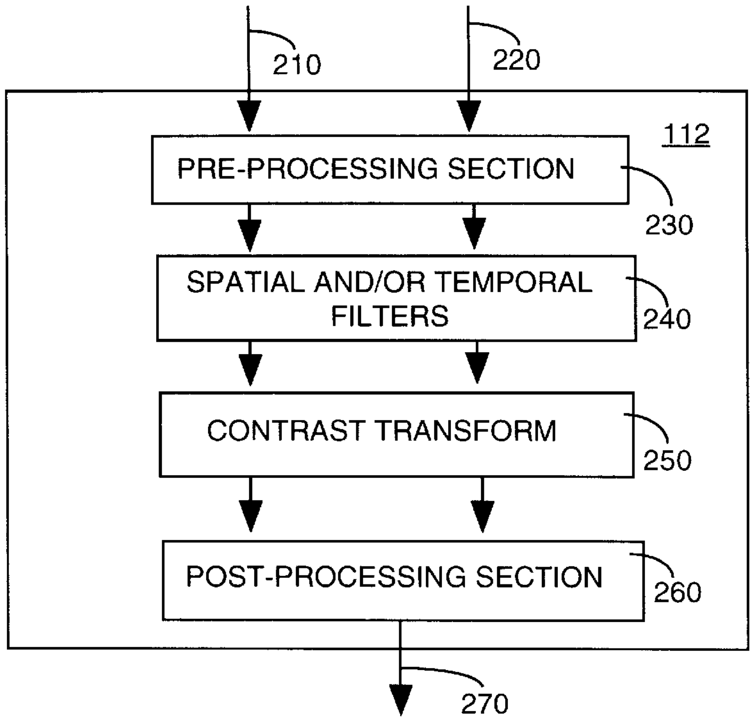
FIG. 2 illustrates a simplified block diagram of the structure of the visual discrimination measure.

FIG. 2 depicts a simplified block diagram of the structure of the visual discrimination measure 112, where two input image sequences 210 and 220 are processed to produce an image metric 270. The visual discrimination measure comprises a pre-processing section 230, spatial and/or temporal filters 240 and a contrast transform 250 and a post-processing section 260.

In the preferred embodiment, the stimuli are two digitized sequences of images, input image sequence A 210 and input image sequence B 220. For example, sequence A may comprise original images (e.g., a reference image sequence) while sequence B may comprise codec processed images of sequence A (e.g., a test image sequence). The input sequences represent time frames of sampled luminance distributions on a planar surface, i.e., as would be returned from a photometer sampling a uniform grid of closely spaced points on the surface of a display device.

However, since the present invention is also designed to account for differences in the chrominance between the two input image sequences, the stimuli may include chrominance components as well. Thus, although the present invention is discussed below with respect to the luminance component of the input image sequence, it should be understood that the present invention can be applied to the chrominance components, either singly or in combination with the luminance component.

The input image sequences are received by an optional preprocessing section 230 to preprocess the input image sequences prior to applying spatial and temporal filtering. The preprocessing is designed to enhance the predictive accuracy (relative to human performance) of the visual discrimination measure.

Generally, the pre-processing section 230 serves to approximate the sampling process of a human eye while adapting the images for optimal digital image processing. Retinal sampling is a process that resamples the stimuli to simulate the sampling process of a human eye.

More specifically, pre-processing section 230 may incorporate a frame rate adjuster, a border inserter, a smoother/interpolator for accounting pixels-to-receptors ratio, a convolver, an image/fixation depth matcher and various samplers to correlate "pixel geometry" with "receptor geometry" (not shown). Examples of these pre-processing apparatus and methods can be found in the patent application entitled "Method And Apparatus For Assessing The Visibility Of Differences Between Two Image Sequences" filed on Mar. 28, 1997 with docket number IDSRC12146, which is hereby incorporated by reference.

To reduce the computational overhead, those skilled in the art will realize that the various components within the pre-processing section 230 can be optionally implemented or replaced with similar processing to address the requirements of different applications. Thus, the input sequences to the spatial and/or temporal filters 240 may simply represent the original unprocessed input images or they may represent the images having undergone through one or more of the various image processing steps of pre-processing section 230.

Returning to FIG. 2, the visual discrimination measure 112 may incorporate one or more spatial and/or temporal filters 240 to separate the luminance component of each input sequence of images into multiple channels, such as a set of channels with a lowpass temporal response and a bandpass spatial response (sustained channels) and another set of channels with a lowpass spatial response and a bandpass temporal response (transient channels). Various combinations of spatial and temporal filters with different analytic forms can be employed to generate these sustained and transient channel responses.

A separation into sustained and transient channels is suggested by the known physiology of vision. Effectively, the sustained channel blurs the input stream (image sequence) temporally, but provides relatively good spatial resolution. Thus, the output of this channel is ideal for looking at fine details and color metric. Conversely, the transient channel blurs the input stream spatially, but provides good temporal resolution which is ideal to detect motion or color changes in the input image sequences.

Alternatively, the visual discrimination measure 112 may incorporate a spatial prefilter such as a separable Gaussian filter. For example, the Guassian filter may apply a five-tap low-pass filter with weights, e.g., (1, 4, 6, 4, 1)/16 to the original input image, sequentially in each direction of the image to generate a blurred image.

Returning to FIG. 2, the outputs from the temporal and/or spatial filters are then forwarded to contrast transform 250 to generate units of local contrast. When the contrast transform is applied to several different spatial or temporal frequency bands, each generated from the preceding, the contrast transform operation is referred to as a contrast pyramid operation. Since bandlimited version of the input image can be obtained in spatial frequency as well as temporal frequency, the contrast pyramid can be implemented in two forms, a spatial contrast pyramid and a temporal contrast pyramid. These contrast pyramids are illustrated respectively in FIG. 3 and FIG. 4.

These two different contrast pyramids can be implemented singly, or in combination to provide a lowpass temporal-bandpass spatial response and a lowpass spatial-bandpass temporal response to the visual discrimination measure 112. Namely, each input image sequence is received into both a spatial contrast transform and a temporal contrast transform.

Returning to FIG. 2, the units of local contrast from the contrast transform 250 are forwarded to post-processing section 260. Generally, the post-processing section 260 serves to account for human contrast sensitivity.

More specifically, post-processing section 260 may incorporate one or more oriented filters for applying orientation tuning, a normalizer for applying normalization, a gain control for applying cross-frequency and/or cross-orientation masking of visual threshold, a transducer for applying a sigmoid non-linearity, a pooler for addressing foveal human sensitivity and a distancer (not shown) for generating an image metric 270. The output of the distancer serves as an image metric.

More specifically, the output is a spatial array of distance values or "JND" values, which can then be used to create a "JND map" for a pair of corresponding input images, i.e., one from input sequence A and one from input sequence B. Examples of these post-processing apparatus and methods can be found in the patent application entitled "Method And Apparatus For Assessing The Visibility Of Differences Between Two Image Sequences" filed on Mar. 28, 1997 with docket number DSRC12146.

Figure 3:
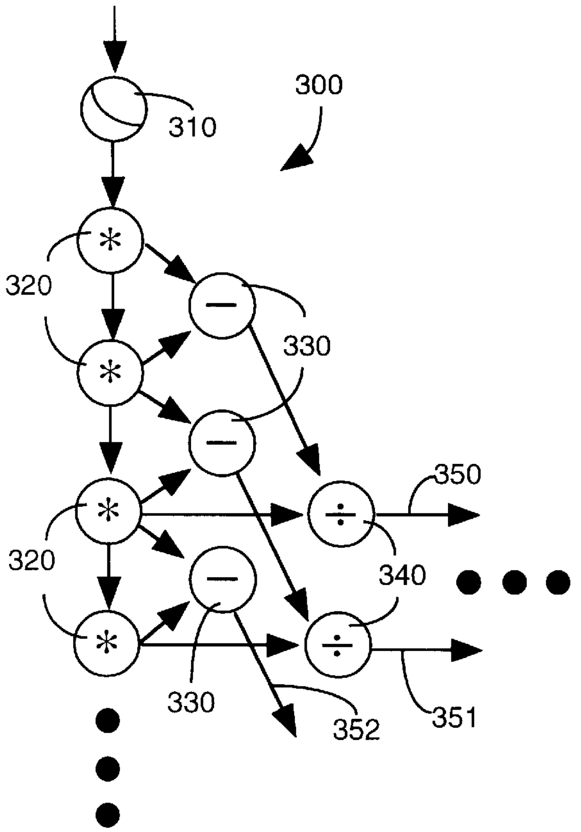
FIG. 3 illustrates a detailed block diagram of the structure of a spatial contrast pyramid.

FIG. 3 illustrates a spatial contrast pyramid 300. In the spatial contrast pyramid, a lowpass temporal filter 310 is followed by a cascaded set of Gaussian spatial filters 320, producing a set of increasingly spatially lowpass (Gaussian) images. Adjacent filter outputs are then subtracted via subtractor 330, producing a set of spatially bandpass (Laplacian) images. Finally, each Laplacian image is divided by a lower level Gaussian via divider 340, to produce a set of bandpass contrast images on path 350–352. Although temporal filter 310 is illustrated as being a part of the spatial contrast pyramid 300, it should be understood that temporal filter 310 can be implemented outside of the contrast pyramid as a separate temporal filter 240, as shown in FIG. 2.

In the preferred embodiment, the temporal filter 310 takes the form of a lowpass temporal filter. More specifically, this temporal filter can apply temporal filtering to each input image sequence, which is represented by I(x,t) to produce a filtered sequence J(x,t) expressed as:

$$J(x,t)=I(x,t) * h(t) \tag{1}$$

where "*" denotes temporal convolution. In the preferred embodiment, the lowpass temporal filter can be expressed as:

$$h(t)=a \exp(-at)\, u(t) \tag{2}$$

where u(t) is the unit step function [u(t)=0 for t<0, else u(t)=1, and a is a fitted parameter. The fitting of a and other parameters in the preferred embodiment can be achieved using spatiotemporal contrast-sensitivity data, such as that of Koenderink and van Doorn, "Spatiotemporal Contrast Detection Threshold Surface Is Bimodal", *Optics Letters* 4, 32–34 (1979).

One implementation of the temporal filter involves a recursive operation on discrete temporal samples of the signal s(i), where i indexes over temporal samples; i.e., where $$h(i)=\alpha h(i-1)+(1-\alpha)s(i) \tag{3}$$

This implementation of a lowpass temporal filter can be used for both temporal filters 310 and 420.

Returning to FIG. 3, after the temporal filtering, each of the resulting raw luminance signals from the temporal filter 310 is received and converted to units of local contrast. Namely, a "contrast pyramid" is generated by decomposing the image into Gaussian and Laplacian pyramids. First, each image is decomposed into a Laplacian pyramid as disclosed by P. J Burt and E. H. Adelson in "The Laplacian Pyramid As A Compact Image Code", IEEE *Transactions on Communications* (1983).

In the preferred embodiment, the luminance component of the input image is decomposed into a set of seven (7) spatial frequency channels or bandpass (pyramid) levels, via Gaussian spatial filters 320 with peak frequencies ranging from 32 through 0.5 cycles/degree. Each level is separated from its neighbors by one octave, i.e., 32, 16, 8, 4, 2, 1 and 0.5. Then, at each point in each level, the Laplacian value is divided by the corresponding point upsampled from the Gaussian pyramid level two levels down in resolution. Namely, to compute the local contrast at each level of the pyramid, a Laplacian (bandpass) pyramid is generated by subtracting via subtractor 330 from each Gaussian level a one-level-blurred copy of itself via subtractor 330; the result is divided via divider 340 by a two-level-blurred copy. Although the preferred embodiment decomposes the input image into a set of seven (7) frequency channels or bandpass (pyramid) levels, the input image can be decomposed into any number of frequency channels.

Figure 4:
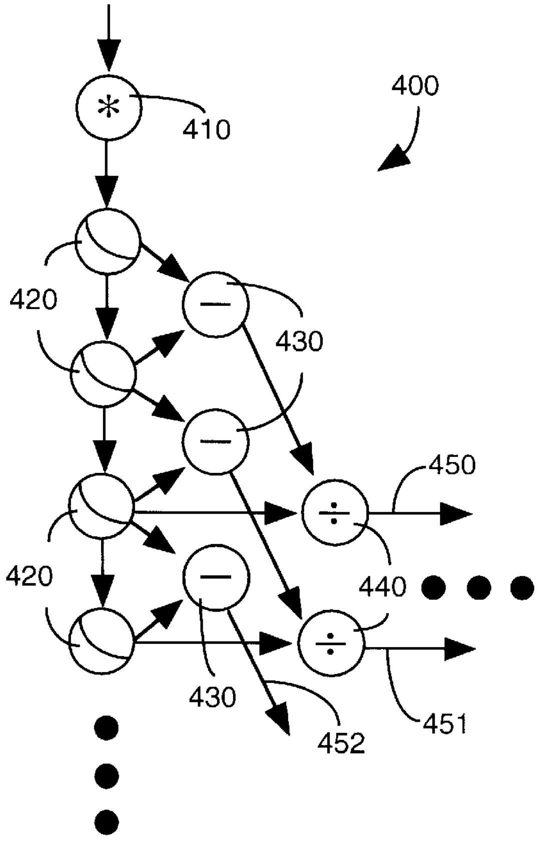
FIG. 4 illustrates a detailed block diagram of the structure of a temporal contrast pyramid.

FIG. 4 illustrates a temporal contrast pyramid 400. An important difference between the spatial contrast pyramid 300 and the temporal contrast pyramid 400 is the reverse application of a spatial filter followed by a cascade of temporal filters. In sum, the spatial contrast pyramid 300 produces a lowpass temporal-bandpass spatial response, while the temporal contrast pyramid 400 produces a lowpass spatial-bandpass temporal response.

More specifically, a spatial filter 410 (low pass) is followed by a cascade of lowpass temporal filters 420 (as discussed above), producing a set of temporally lowpass, spatially low pass images. Adjacent filter outputs are then subtracted via subtractor 430, producing a set of temporally bandpass (Laplacian) images. Finally, each Laplacian image is divided by dividers 440 by a lower level temporal lowpass image, to produce a set of temporally bandpass contrast images on paths 450–452. Although spatial filter 410 is illustrated as being a part of the temporal contrast pyramid 400, it should be understood that spatial filter 410 can be implemented outside of the contrast pyramid as a separate spatial filter 240, as shown in FIG. 2.

Figure 5:
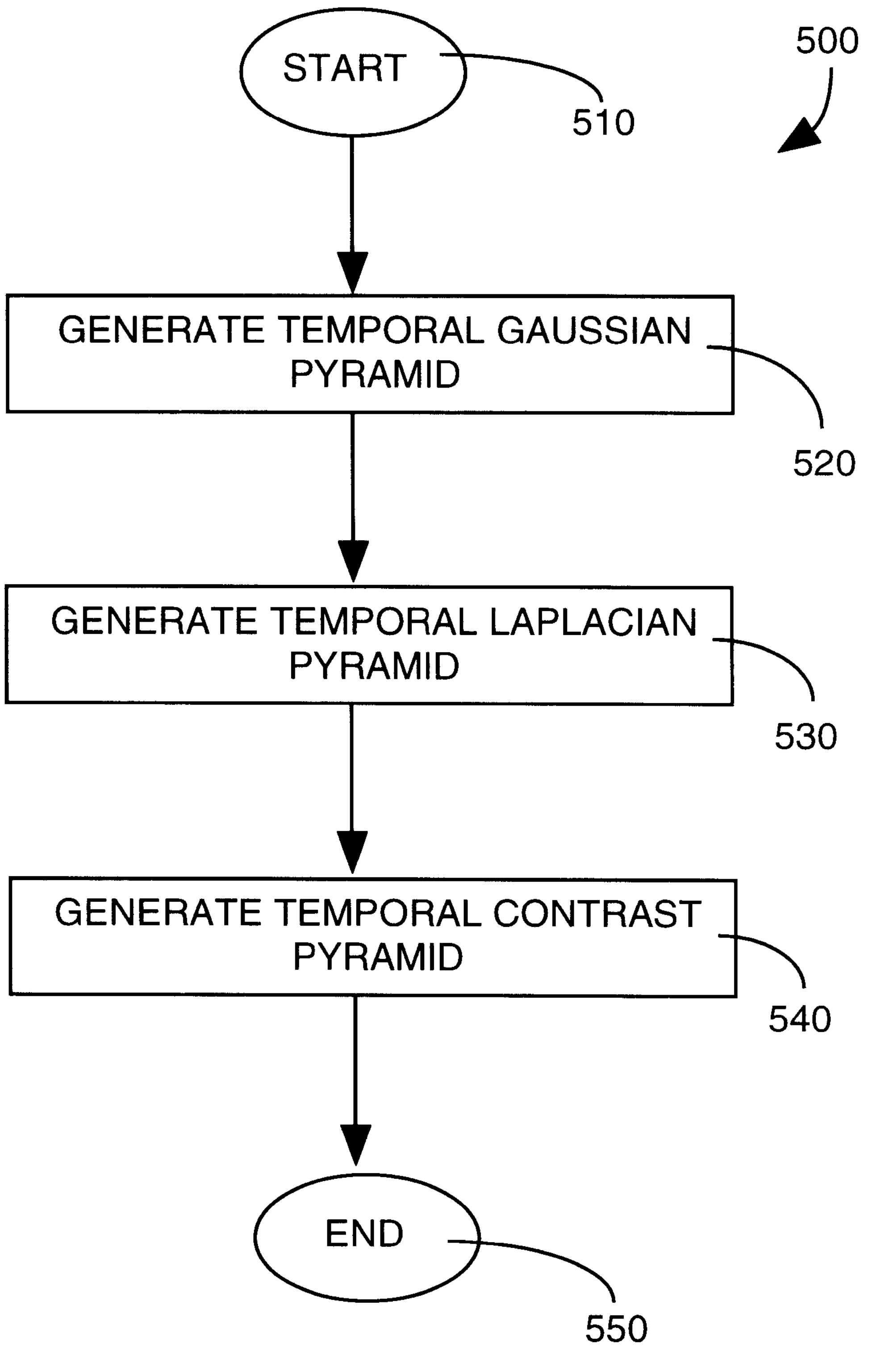
FIG. 5 illustrates a flowchart of a method for generating a temporal contrast pyramid.

Although the temporal contrast pyramid 400 utilizes a cascade of lowpass temporal filters in the preferred embodiment, the present invention is not limited to this specific implementation. Other forms of lowpass temporal filters, e.g., temporal FIR filters with all non-negative taps, can be incorporated into the present invention to achieve similar results FIG. 5 illustrates a method 500 for constructing a temporal contrast pyramid. Method 500 begins at step 510 and proceeds to step 520 where a temporal lowpass pyramid is constructed. The spatially lowpassed original input image, $G_1$ is called the first level of the pyramid. Subsequent levels, at lower resolutions, are obtained by an operation called "Reduce".

The Reduce operation applies down-sampling to the spatially lowpassed original input image sequentially in each direction of the image to generate a blurred image. The resulting blurred image is then subsampled by a factor of 2 to create the next level, $G_2$. Method 500 applies the Reduce operation recursively to each new level, and stops when the top level is reached, whose default value is 7.

Referring to FIG. 5, method 500 generates a temporal Laplacian pyramid in step 530. The temporal Laplacian pyramid is generated from the temporal lowpass pyramid of step 520. The k'th level of the temporal Laplacian pyramid, $L_k$, is computed from $L_k=G_k-G_{k+1}$. The point-by-point subtraction of adjacent temporal lowpass pyramid levels requires prior up-sampling of the $G_{k+1}$ level to match the resolution of the $G_k$ level through an operation called "Expand".

The Expand operation up-samples the image of $G_k$ at Gaussian-pyramid level k by a factor of 2 (i.e., the original samples are spaced out with zeros in between them), and the resulting larger image is convolved with the weights (1, 4, 6, 4, 1)/16 in both x and y directions. In computing the k'th level $L_k$ of the temporal Laplacian pyramid, the Expand operation is alternated with point-by-point subtraction, i.e., $L_k = G_k - \text{Expand}(G_{k+1})$. This process is continued from the coarsest temporal lowpass level (k=7) to the finest level (k=1).

In step 540, method 500 computes a temporal contrast pyramid. The local contrast pyramid is computed by dividing each pixel value at each level of the temporal Laplacian pyramid by the corresponding Gaussian value from two (2) levels up interpolated (by the Expand operation) to the current temporal Laplacian pyramid level size. Divide-by-zero errors are avoided by adding a small constant to the divisor (e.g., 1e-10). Once the temporal contrast pyramid is constructed, method 500 ends in step 550.

There has thus been shown and described a novel temporal contrast pyramid architecture and concomitant method that decomposes an image stream into units of local contrast for improving image fidelity and visual task applications. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. Apparatus for computing units of local contrast from an input sequence having a plurality of signals, said apparatus comprising:

a plurality of cascaded temporal filters for generating a plurality of temporal filtered signals from each of the signal of the input sequence;

at least one subtractor, coupled to at least two of said temporal filters, for generating a temporal bandpass signal; and at least one divider, coupled to one of said subtractor and one of said temporal filter, for generating a temporal bandpass contrast signal.

2. The apparatus of claim 1, wherein said plurality of signals are images.

3. The apparatus of claim 1, further comprises:

a spatial filter, coupled to one of said temporal filter, for applying spatial filtering to the image of the input sequence to generate a spatial filtered image, where said spatial filtered image is used to generate said temporal filtered signals.

4. The apparatus of claim 1, wherein said temporal filters are lowpass filters.

5. The apparatus of claim 4, wherein each of said temporal filter is expressed as:

$$h(t) = a \exp(-at)\, u(t)$$

where u(t) is the unit step function [u(t)=0 for t<0, else u(t)=1, and a is a fitted parameter.

6. The apparatus of claim 1, wherein said temporal filters are FIR filters.

7. The apparatus of claim 1, wherein said plurality of cascaded temporal filters, said subtractor, and said divider form a temporal contrast pyramid.

8. Method for computing units of local contrast from an input sequence having a plurality of signals, comprising the steps of:

(a) using a plurality of cascaded temporal filters to generate a plurality of temporal filtered signals from each of the signal of the input sequence;

(b) generating a temporal bandpass signal from adjacent set of said temporal filtered signals; and (c) dividing said temporal bandpass signal by one of said temporal filtered signals to generate a temporal bandpass contrast signal.

9. The method of claim 8, wherein said plurality of signals are images.

10. The method of claim 8, further comprising the step of:

(a') spatial filtering the image of the input sequence to generate a spatial filtered image, where said spatial filtered image is said signal of the input sequence in step (a).

11. The method of claim 8, wherein said temporal filters are lowpass filters.

12. The method of claim 8, wherein each of said temporal filter is expressed as:

$$h(t) = a \exp(-at)\, u(t)$$

where u(t) is the unit step function [u(t)=0 for t<0, else u(t)=1, and a is a fitted parameter.

13. The method of claim 8, wherein said temporal filters are FIR filters.

14. Method for computing units of local contrast from an input sequence having a plurality of signals, comprising the steps of:

(a) generate a plurality of temporal filtered signals from each of the signal of the input sequence;

(b) generating a temporal bandpass signal from adjacent set of said temporal filtered signals; and (c) generating a temporal bandpass contrast signal from said temporal bandpass signal and said temporal filtered signals.

15. The method of claim 14, wherein said plurality of signals are images.

16. The method of claim 14, further comprising the step of:

(a') spatial filtering the image of the input sequence to generate a spatial filtered image, where said spatial filtered image is said signal of the input sequence in step (a).

* * * * *